Oct. 10, 1961 R. T. MADDING 3,003,791

TELEPHONE PAD ATTACHMENT

Filed May 20, 1959 2 Sheets-Sheet 1

Robert T. Madding

INVENTOR.

BY Clarence A. O'Brien
and Harvey B. Jacobson
Attorneys

Oct. 10, 1961 R. T. MADDING 3,003,791
TELEPHONE PAD ATTACHMENT
Filed May 20, 1959 2 Sheets-Sheet 2

Robert T. Madding
INVENTOR.
BY Clarence A. O'Brien
and Harvey B. Jacobson
Attorneys 3,003,791

TELEPHONE PAD ATTACHMENT

Robert T. Madding, 1115 S. Jackson, Apt. 2, Amarillo, Tex.

Filed May 20, 1959, Ser. No. 814,593
4 Claims. (Cl. 281—12)

This invention relates generally to telephone attachments and more particularly to a novel attachment construction utilized for securing a pad, in the form of a roll of writing paper, to the telephone.

It is well-known that it is desirable and convenient to have writing means proximate a telephone to enable the person using the phone to record data received thereover. It of course is undesirable to have to leave the phone to obtain paper and a writing instrument each time a message has to be taken. Accordingly, most persons keep writing paper and a writing instrument near the phone at all times. However, these pads and writing instruments are often misplaced and not conveniently available when desired. Also, inasmuch as the paper may be moved from the phone, important messages are often misplaced and never received. In view of the above, it is the principal object of this invention to provide a novel telephone attachment construction for supporting writing means on a conventional telephone in a convenient manner.

It is a more particular object of this invention to provide an improved telephone pad attachment construction which may be reliably secured to the telephone with a minimum of effort.

It is a still further object of this invention to provide a novel telephone attachment construction which is convenient, durable, and relatively inexpensive to manufacture.

In accordance with the above stated objects, below is particularly described the novel constructional details and utilization of the telephone pad attachment comprising this invention. Initially, it is to be noted that the invention herein has been designed for utilization with a type of telephone wherein a recessed portion is formed below the telephone cradle. A support member having a vertical leg and a horizontal leg is secured to the telephone by forming resilient retention means integral with the horizontal leg and resiliently forcing the resilient means into the telephone's recessed portion. The resilient means, comprising an arcuate end portion, includes a first part spaced from and opposed to the horizontal leg. The inherent resiliency of the support member causes the first part to be urged away from the horizontal leg and accordingly the support member is gripped by the telephone adjacent the recessed portion. A frame member is secured to the vertical leg of the support member and has a rear depending wall opposed to the vertical leg. A spindle supported between the rear wall and the vertical leg has a paper roll rotatably mounted thereon with the paper extending through aligned and opposed slits formed in the frame member. A window is positioned between the slits for revealing the paper passing therethrough. In passing, it is to be noted that the second slit utilized is serrated about the edges for facilitating the cutting of the paper thereby. A housing is adapted to be carried by the support member and frame. The housing includes a front wall having an opening therein which receives the vertical leg of the support member for preventing movement of the housing with respect to the support member and frame. A slit is formed in the housing and alignable with the slits in the frame member while a window in the housing is alignable with the window in the frame member. Accordingly, it will be appreciated that the paper of the paper roll may be brought through the first frame member slit and passed beneath the windows in the frame member and the housing and outward through the other slit in the frame member and housing slit. To facilitate the use of the invention, a depressed portion is formed in the housing above the window thereof so that a writing instrument may be retained therein.

Other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 5:
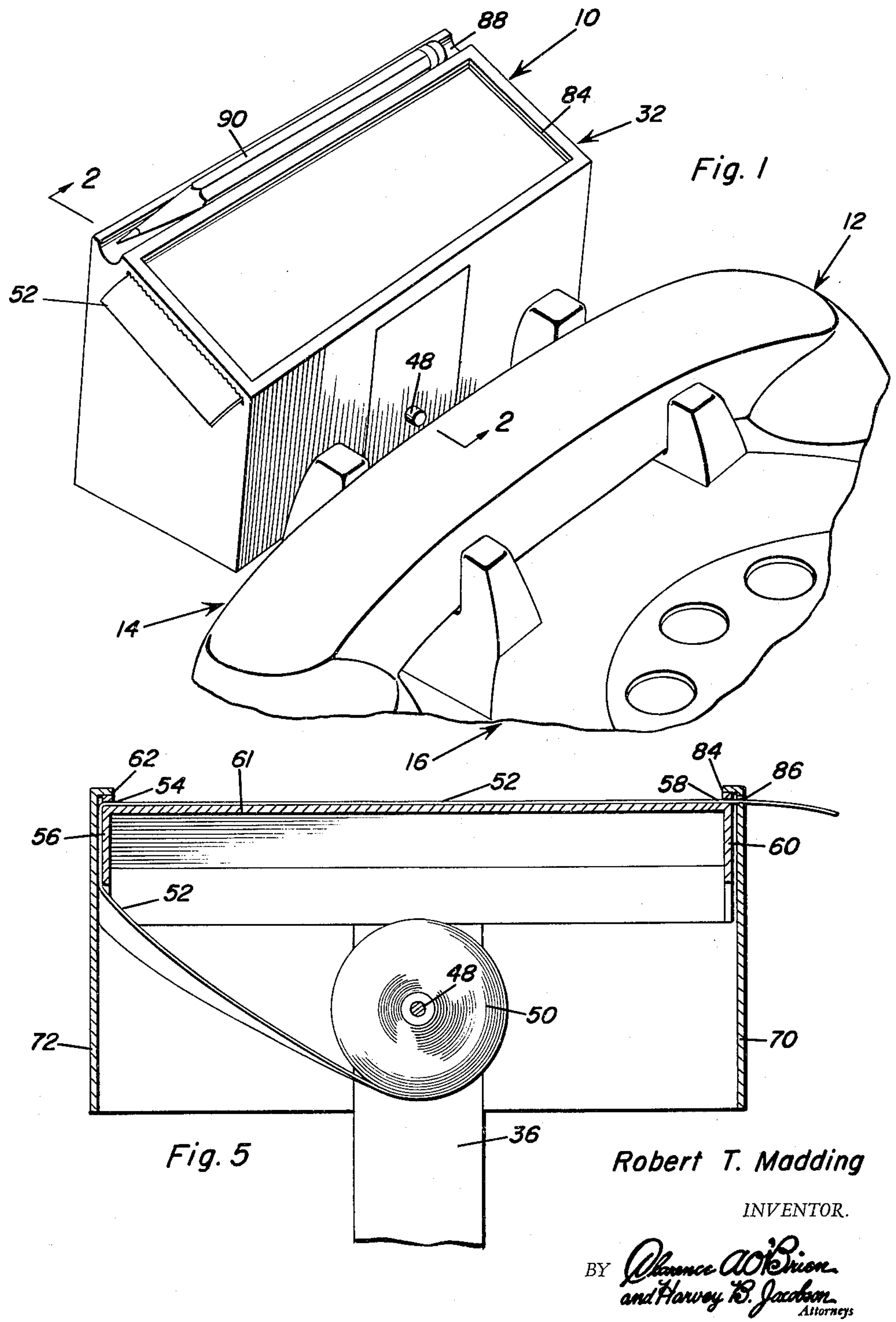
FIGURE 1 is a fragmentary perspective view of the invention and telephone used therewith.
FIGURE 5 is a fragmentary enlarged sectional view taken substantially along the plane 5—5 of FIGURE 2.

With continuing reference to the drawings numeral 10 generally represents the telephone pad attachment forming the subject matter of this invention and adapted to be utilized with a conventional phone 12 having a hand-set 14 and telephone body portion 16 including a cradle portion 18 adapted to receive the hand-set 14. A recessed portion 20 is generally formed beneath the cradle portion 18 and use is made thereof for securing the telephone pad attachment 10 to the conventional telephone 12. It is to be noted that the recess portion 20 is defined by telephone surfaces 22, 24 and 26.

Figures 2, 3, 4:
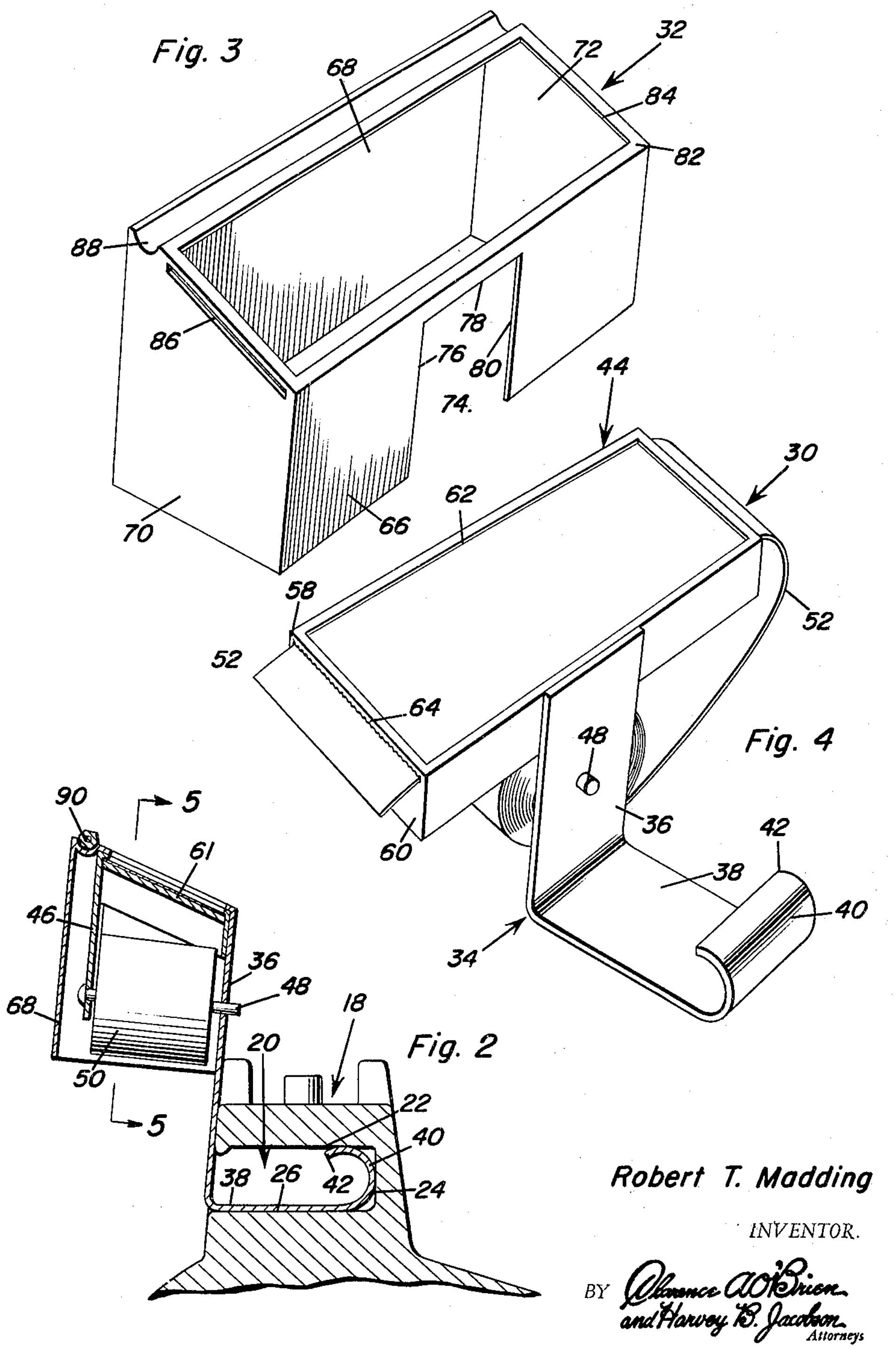
FIGURE 2 is a fragmentary sectional view taken substantially along the plane 2—2 of FIGURE 1.
FIGURE 3 is a perspective view of the housing forming a portion of the invention.
FIGURE 4 is a perspective view of the support member and frame member forming another portion of the invention.

The attachment 10 forming the subject matter of this invention includes generally a support member and frame member designated as 30 and a housing to be fitted thereover designated as 32. The support member proper 34 includes a vertical leg 36 and a horizontal leg 38 formed integral therewith. The horizontal leg 38 terminates in an arcuate end portion 40 which has a part 42 spaced from and substantially opposed to the horizontal leg 38. The arcuate end portion 40 is received in the recessed portion 20 of the telephone, as illustrated in FIGURE 2, and bears against the surfaces 22 and 24 to urge the horizontal leg 38 against the surface 26 so that the support member 34 is securely and resiliently held by the telephone. Attached to and behind the vertical leg 36 is a frame member generally illustrated as 44. The frame member 44 is substantially in the form of a rectangular prism but includes a depending rear wall 46 which is substantially parallel to and spaced from the vertical leg 36. Aligned apertures in the rear wall 46 and vertical leg 36 receive an unthreaded bolt 48 therethrough which acts as a spindle for the rotatably mounted paper roll 50. The paper 52 from the paper roll extends through a slit 54 in one end surface 56 of the frame member 44 and out through a second slit 58 in the end 60 of the frame member 44. A window 62 formed in the frame member 44 exposes the paper 52 therethrough. The slit 58 in end surface 60 of the frame member 44 is serrated as at 64 for facilitating the selective cutting of the paper 52 from roll 50.

The housing 32 includes depending front and rear surfaces 66 and 68 respectively and side surfaces 70 and 72. In the contemplated utilization of the invention, the housing 32 is received over the frame member 44 securing the vertical leg 36 in an opening 74 formed in the front surface 66 of the housing 32. As illustrated, it is preferable that the vertical leg 36 be rectangular and that the opening 74 be of the same shape so that the leg 36 may be received in the opening 74 and abut the edges 76, 78 and 80 whereby the housing 32 will be securely retained on the support member 34 over the frame member 44 as illustrated in FIGURE 1. The top surface 82 of the housing 32 defines a window 84 therein which is aligned with the window 62 formed in the frame member as illustrated in FIGURES 1 and 5.

A slit 86 is formed in the side surface 70 of the housing 32 and is aligned and immediately adjacent to the serrated slit 58 of the frame member 44. It will be apparent that in the utilization of the attachment 10, the paper 52 will pass initially through the slit 54 and then through the slits 58 and 86. It will be seen that the paper 52 will be exposed through the superposed windows 84 and 62 with the writing surface 61 formed immediately therebeneath. It will be apparent that the writing surface 61 bridges the end surfaces 56 and 60 of the frame member 44.

A longitudinal depression 88 is formed in the housing 32 above the window 84 and is adaptable to receive a writing implement as a pencil 90 therein for convenient use.

From the foregoing, it will be appreciated that what has been described is a novel and inexpensive construction for attaching writing paper and retaining writing instruments proximate a telephone. The apparent novel cooperation between the housing 32 and the vertical leg 36 of the support member 34 allows the device to function in an extremely beneficial and efficient manner. Of course, any satisfactory materials may be utilized in the construction of the device and also it is apparent that the elements thereof may be attractively painted to enhance appearance.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A telephone pad attachment for utilization with telephones having a recessed portion below the telephone cradle comprising a support member, said support member including a vertical leg and a horizontal leg, said horizontal leg received in said recessed portion, resilient means retaining said horizontal leg in said recessed portion, a frame member secured to said vertical leg, a rear wall dependingly supported from said frame member spaced from said vertical leg, a spindle secured between said rear wall and said vertical leg, a roll of paper received on said spindle, a window in said frame member, aligned slits in said frame member at opposite ends of said window for receiving a portion of said paper roll therethrough, one of said slits defining a serrated edge for facilitating the cutting of the paper passing therethrough, said resilient means including an arcuate end portion formed integral with said horizontal leg, said arcuate end portion including a first part spaced from and opposed to said horizontal leg for bearing against a portion of said telephone to retain said support member fixed to said telephone, a housing receivable over said support member, said housing including a window alignable with said frame member window and a slit alignable with said slit defining said serrated edge, said housing including a front wall defining an opening therein, said vertical leg tightly received in said opening for securing said housing.

2. The combination of claim 1 wherein said housing defines a longitudinal depression therein.

3. A telephone pad attachment comprising an angular bracket for mounting on a telephone, said bracket including a vertical leg, a generally rectangular frame mounted transversely on the upper end portion of said vertical leg, a forwardly and downwardly inclined writing surface in the upper portion of the frame adjacent to, but spaced below the top thereof, said frame including end walls having slits therein above said writing surface, means for mounting a roll of paper below the frame, said slits for slidably receiving the paper from the roll and said writing surface being adapted to support the paper between the slits, and a housing removably mounted on the frame and having a window in its top portion for exposing the paper on the writing surface, said housing being substantially rectangular in plan and telescopically receiving the frame, said housing being slightly longer than the frame and including end walls, one of the housing end walls being spaced from the corresponding frame end wall for the passage of the paper therebetween to one of the slits, the other housing end wall having a slit therein aligned with the first-named slits.

4. A telephone pad attachment comprising an angular bracket for mounting on a telephone, said bracket including a vertical leg, a generally rectangular frame mounted transversely on the upper end portion of said vertical leg, a forwardly and downwardly inclined writing surface in the upper portion of the frame adjacent to but spaced below the top thereof, said frame including end walls having slits therein above said writing surface, means for mounting a roll of paper below the frame, said slits for slidably receiving the paper from the roll and said writing surface being adapted to support the paper between the slits, and a housing removably mounted on the frame and having a window in its top portion for exposing the paper on the writing surface, said housing being substantially rectangular in plan and telescopically receiving the frame, said housing being slightly longer than the frame and including end walls, one of the housing end walls being spaced from the corresponding frame end wall for the passage of the paper therebetween to one of the slits, the other housing end wall having a slit therein aligned with the first-named slits, said housing further including a front wall having a recess therein slidably receiving the vertical bracket leg for positively securing said housing against longitudinal sliding movement on the frame.

References Cited in the file of this patent

UNITED STATES PATENTS

| | | |
|---|---|---|
| 1,472,530 | McComas | Oct. 30, 1923 |
| 1,759,194 | Hansen | May 20, 1930 |
| 2,488,516 | Shore | Nov. 15, 1949 |
| 2,566,989 | Lathrop | Sept. 4, 1951 |

FOREIGN PATENTS

| | | |
|---|---|---|
| 154,312 | Great Britain | Nov. 22, 1920 |